United States Patent

[11] 3,576,348

[72] Inventor Bruno Lutz Zielinski
 Friedrichshafen, Bodensee, Germany
[21] Appl. No. 806,779
[22] Filed Mar. 6, 1969
[45] Patented Apr. 27, 1971
[73] Assignee Demag Aktiengesellschaft
 Duisburg, Germany
[32] Priority Mar. 7, 1968
[33] Germany
[31] P 16 52 532.9

[54] ROCK SPLITTING APPLIANCE
 7 Claims, 8 Drawing Figs.
[52] U.S. Cl. .................................................. 299/23,
[51] Int. Cl. .................................................. E21c 37/04
[50] Field of Search .......................................... 299/21—23

[56] References Cited
UNITED STATES PATENTS

| | | | |
|---|---|---|---|
| 351,850 | 11/1886 | Burnett | 299/23 |
| 2,261,017 | 10/1941 | Chandler | 299/23 |
| 2,357,903 | 9/1944 | Miller | 299/23 |
| 3,439,954 | 4/1969 | Daroa | 299/23X |

Primary Examiner—Ernest R. Purser
Attorney—McGlew and Toren

ABSTRACT: A rock splitting appliance includes a cylindrical casing having a carrier, for a wedge shape speaker, axially displaceable therein, the spreader cooperating with a pair of semicylindrical pressure shells fixed against axial movement in the bottom end of the casing but being radially displaceable. A motor on the upper end of the casing has its power transmitted to the spreader through an intermediate drive, the intermediate drive preferably comprising a screw rotatable by the motor and a nonrotatable nut threaded on the screw and secured to the carrier for the spreader.

PATENTED APR 27 1971　　　　　　　　　　3,576,348

Inventor
BRUNO LUTZ ZIELINSKI
By: McGlew and Toren
Attorneys

ROCK SPLITTING APPLIANCE

BACKGROUND OF THE INVENTION

A known rock splitting appliance is driven by a hydraulic piston-cylinder motor. A part of the motor casing has the form of a circular cylinder, the piston acting as the carrier of the spreader. The spreader of this appliance is of such slender design that considerable movement is required for driving the pressure shells apart once they have been introduced into the bore hole in the rock, or considerable power has to be generated for splitting the rock. In the process, the cylinder is required to enormous pressure forces. Now, since the appliance has to be portable the pressures used must be in the highest pressure range. Working pressures amounting to 500 atm., as employed in practical operations, make the highest demands on material, sealing arrangements and sealing material. The source for the generation of pressure and the line system, for which flexible hosing is used in practical applications, must likewise meet these high demands. The known device thus constitutes an expensive working appliance which is prone to trouble.

SUMMARY OF THE INVENTION

The object of the present invention is to replace the hydraulic equipment by mechanical elements in order to reduce both the structural weight and the price to a level far below those of the known device. What is more, the time required for splitting can be chosen as required and the pressure may be a multiple of that generated by the known device.

The invention consists in the power of a motor being transmitted to the spreader via an intermediate drive. This drive may be in the form of a screw, an eccentric or a toggle arrangement. In a preferred application, the motor output shaft is coupled with a screw which is threadedly engaged with a nut rigidly connected with a spreader carrier which is freely adjustable along the screw in the casing while the flat-shaped spreader is guided in the casing bottom so that it can move longitudinally but not rotate. The torques which have to be withstood by the casing bottom may be minimized by suitable friction-reducing measures in the screw drive proper so that they may be disregarded. To absorb these forces the invention provides a pair of clamping shells, the retaining ends of which are mounted in a casing bottom slot so that they cannot rotate. Screw and screw nut engage one another in a well-known arrangement. Power is generated by means of a torque motor. Screw pitch and motor speed, say, of an air motor, can be so matched that a stroke of 200 mm. is attained with a direct drive using, for instance, 60 revolutions per minute, thus building up a pressure of 140 tons, within half a minute, between the pressure shells.

BRIEF DESCRIPTION OF THE DRAWINGS

The accompanying drawings show a typical application of the invention. The following FIGS. are included.

GENERAL DESCRIPTION OF THE PREFERRED EMBODIMENT

Figure 1:
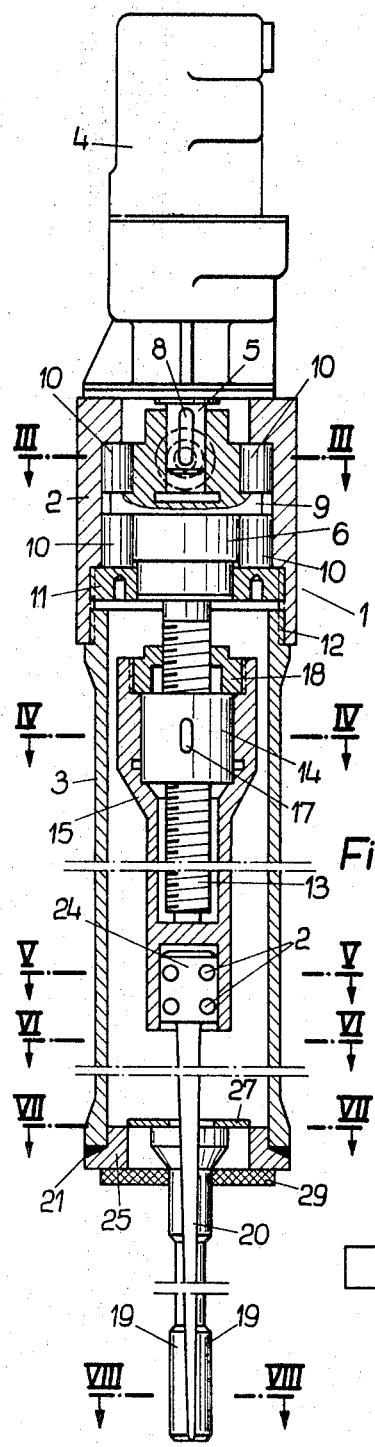
FIG. 1 Longitudinal section with the appliance in the starting position.
Figure 2:
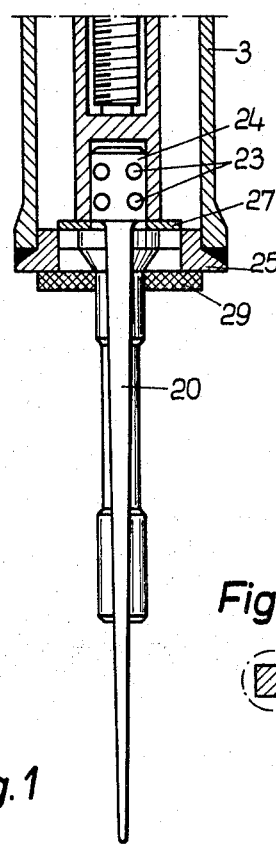
FIG. 2 Partial section of the appliance as per FIG. 1 in the end position.

Casing 1 is composed of casing section 2 and casing section 3 which are threadly interconnected. Flange-mounted to the drive end of casing section 2 is the air motor 4, the shaft 5 of which projects into casing section 2 where it engages with screwhead 6.

Figure 3:
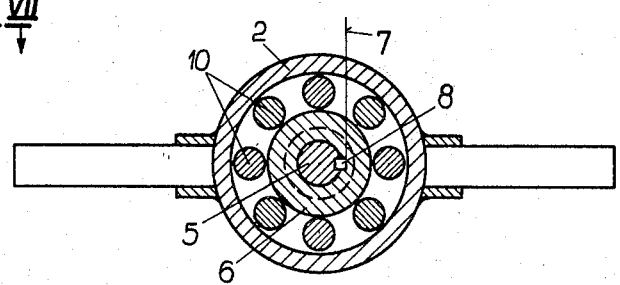
FIG. 3 Section along line III–III of FIG. 1
FIG. 4 Section along line IV–IV of FIG. 1
FIG. 5 Section along line V–V of FIG. 1
FIG. 6 Section along line VI–VI of FIG. 1
FIG. 7 Section along line VII–VII of FIG. 1 and
FIG. 8 Section along line VIII–VIII of FIG. 1

FIG. 3 is a section through the connection between groove 7 and featherkey 8 between shaft stub 5 and screwhead 6. Screwhead 6 is supported with its collar 9 between two self-aligning roller bearings 10 which are retained in the casing by means of a retaining disc 11.

Figure 4:
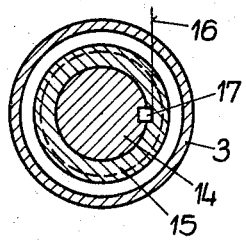
Figure 5:
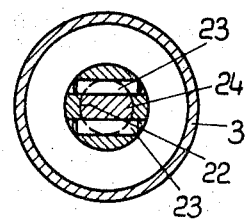
Figures 6, 8:
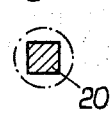
Figure 7:
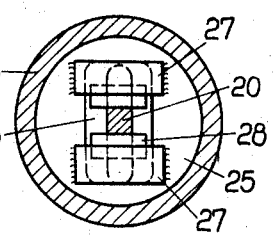

The thread which takes the retaining disc 11 also receives the threaded portion 12 at the end of casing section 3 which latter essentially has the form of a tube. Projecting into this casing section is screw 13 which acts together with screw nut 14. The latter, in turn, is enclosed in spreader carrier 15 where it is secured against rotation by means of groove and featherkey 16, 17 (FIG. 4) being, retained by threaded portion 18. The spreader carrier with the nut and threaded portion 18 form an integral unit vis-a-vis screw 13. Friction in the threads between screw 13 and nut 14 can be practically completely eliminated using balls or other antifriction rollers in the well-known fashion. A cylindrical, sufficiently deep hole is drilled into the rock to be split, the diameter of this hole being slightly larger than the diameter of the pair of pressure shells 19 in the starting position as shown in FIG. 8. As can be seen from FIG. 8, the spreader 20 is positioned between the shells 19. The pair of pressure shells 19 can be radially shifted but not rotated in a slot provided in bottom 21 of the tubular casing section 3 so that the two shells 19 are increasingly transversely moved while the spreader 20 describes its longitudinal movement. In this way, a high pressure is built up in the bore hole with the result of the rock splitting.

The spreader 20 has a cylindrical end 24 which is received in dead end bore 22, being retained by four cylindrical pins 23. In this way, screw nut 14, spreader carrier 15 and spreader 20 form a rigid unit. So far as the frictional forces in the screw drive are still effective in the form of torque, they are taken up in bottom 21 at the end of the tubular casing section 3. The bottom consists of insert 25 which is welded into the end of casing section 3 and has a wide slot 26 partly covered by sheet plate 27 at both sides. The cover plate retains the ends 28 of the pair of pressure shells 19 in axial direction, these ends essentially forming a square partly beveled towards the semicylindrical portion. The semicylindrical portion of the pair of pressure shells is arranged in an end-disc 29 made of rubber or similar material, which also acts as a dust seal and resetting element for the pair of pressure shells 19.

Rotation of the air motor 4 effects the rotation of screw 13 at output speed and the longitudinal movement of screw nut 14 and spreader carrier 15 with spreader 20 in the longitudinal direction of casing 1. Even if the pair of pressure shells 19 is inserted into the rock bore hole, casing 1 will not change its position relative to the rock to be split. The spreader 20 is moved longitudinally within the casing, projecting between the two pressure shells 19, which remain stationary together with casing 1, finding room in the bore hole extension provided in the rock. The depth of the bore hole must be such that the rock becomes positively split before the spreader 20 reaches the bottom of the bore hole after exiting from the pair of pressure shells 19.

I claim:
1. A rock splitting appliance comprising, in combination, a casing; a carrier displaceable longitudinally within said casing; a wedge shape spreader mounted in said carrier; a pair of semicylindrical pressure shells mounted in an end of said casing and embracing said spreader; said pressure shells having elongated uniplanar inner surfaces in continuous engagement, throughout their entire lengths, with the spreading surfaces of said spreader in all positions of said spreader relative to said pressure shells; a torque motor mounted on said casing; and an intermediate mechanical drive connecting said motor to said carrier for longitudinal displacement of said carrier.
2. A rock splitting appliance according to claim 1 in which the intermediate drive is in the form of a screw drive (13, 14).
3. A rock splitting appliance according to claim 1 in which the motor is a rotary air motor.
4. A rock splitting appliance according to claim 3 in which the pair of pressure shells (19) have retaining ends (24) and are nonrotatably retained in a slot (26) in the bottom (25) of casing (3).

5. A rock splitting appliance comprising, in combination, a casing; a carrier displaceable longitudinally within said casing; a wedge shape spreader mounted in said carrier; a pair of semicylindrical pressure shells mounted in an end of said casing and embracing said spreader; a torque motor mounted on said casing; an intermediate mechanical drive connecting said motor to said carrier for longitudinal displacement of said carrier; said motor being a rotary air motor having an output shaft; said intermediate drive including a screw rotatably mounted in said casing; means coupling said output shaft to said screw; a nut rigidly connected with said carrier and threadedly engaged with said screw; said splitter having a flat shape; and means at said first-mentioned end of said casing guiding said splitter for longitudinal movement while restraining said spreader against rotation; said carrier being freely movable along said screw within said casing.

6. A rock splitting appliance, according to claim 5, including antifriction means disposed between the threads of said screw and said nut.

7. A rock splitting appliance, as claimed in claim 6, in which said motor is a rotary air motor; the axial movement resulting from rotation of said screw providing a work-performing force.